(No Model.) 8 Sheets—Sheet 1.

V. L. OURDAN.
ENGRAVING MACHINE.

No. 435,246. Patented Aug. 26, 1890.

WITNESSES
Enos Newman.
Joseph Litkins

INVENTOR.
VINCENT L. OURDAN
BY
Hopkins & Atkins
ATTORNEY.

(No Model.) 8 Sheets—Sheet 2.

V. L. OURDAN.
ENGRAVING MACHINE.

No. 435,246. Patented Aug. 26, 1890.

WITNESSES:

INVENTOR
VINCENT L. OURDAN
BY
ATTORNEY.

(No Model.) 8 Sheets—Sheet 4.

V. L. OURDAN.
ENGRAVING MACHINE.

No. 435,246. Patented Aug. 26, 1890.

WITNESSES:

INVENTOR.
VINCENT L. OURDAN.
BY
ATTORNEY.

(No Model.)
8 Sheets—Sheet 5.
V. L. OURDAN.
ENGRAVING MACHINE.
No. 435,246.
Patented Aug. 26, 1890.
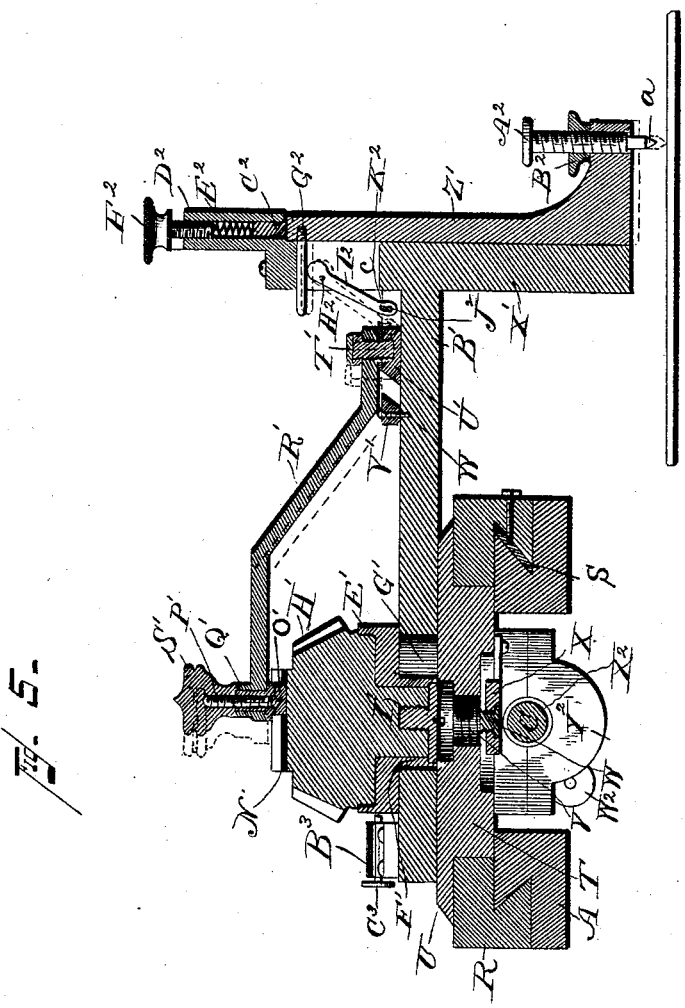
WITNESSES:
INVENTOR.
VINCENT L. OURDAN,
BY
Hopkins & Atkins
ATTORNEY.

(No Model.) 8 Sheets—Sheet 6.
V. L. OURDAN.
ENGRAVING MACHINE.
No. 435,246. Patented Aug. 26, 1890.
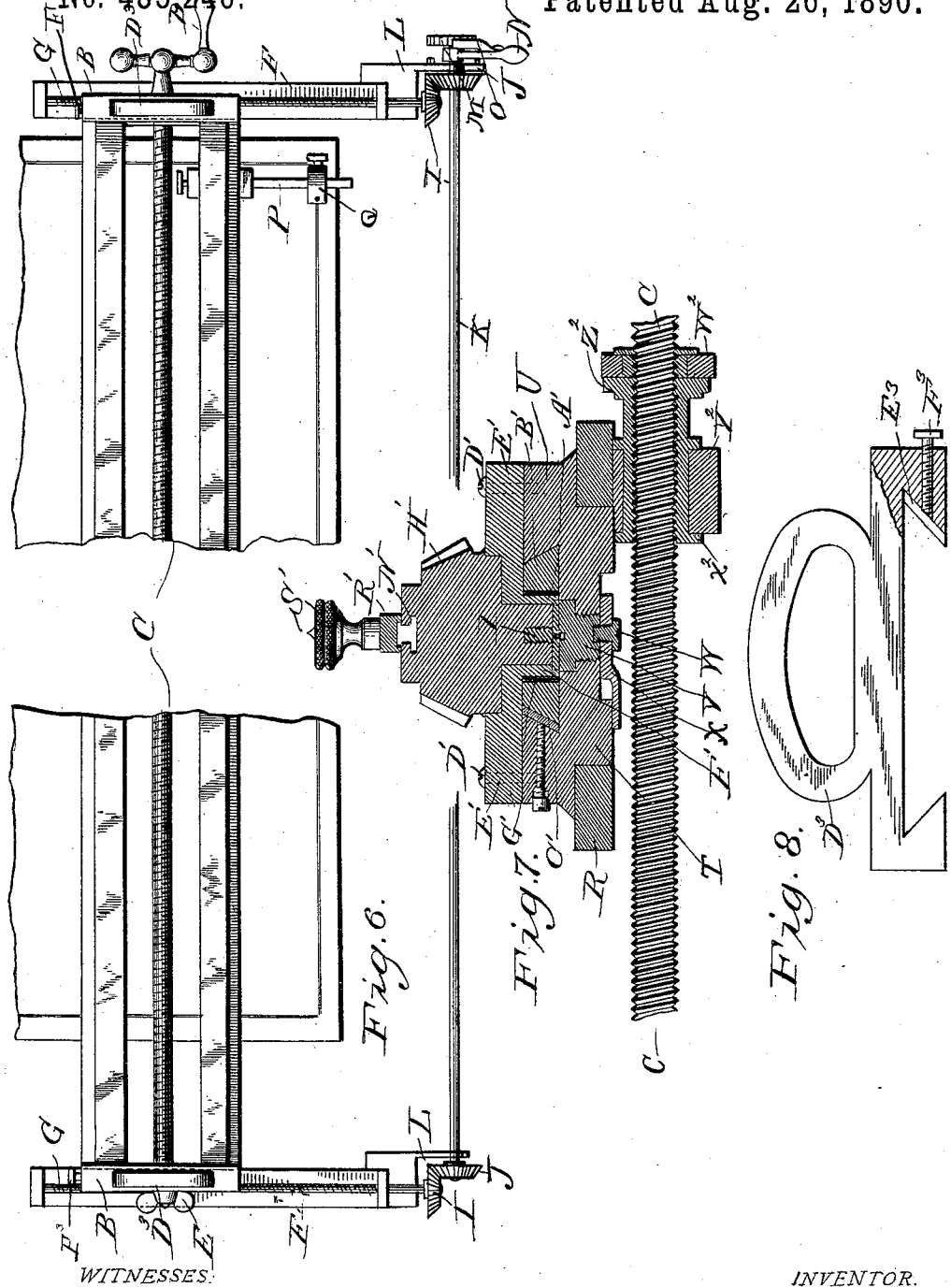
WITNESSES:
Enos Newman
Joseph L. Atkins
INVENTOR.
VINCENT L. OURDAN
BY
Hopkins & Atkins
ATTORNEY.

(No Model.) 8 Sheets—Sheet 7.
V. L. OURDAN.
ENGRAVING MACHINE.
No. 435,246. Patented Aug. 26, 1890.
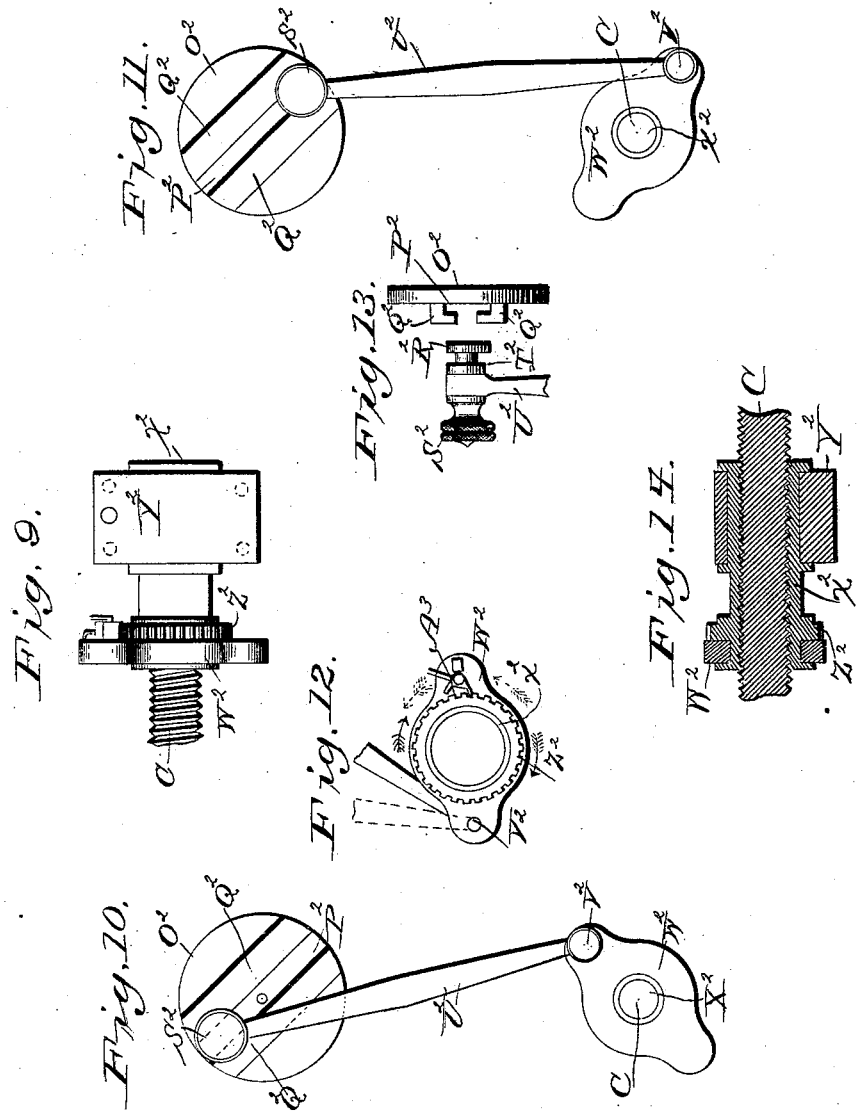
WITNESSES:
Enos Newman.
Joseph L. Atkins.
INVENTOR.
VINCENT L. OURDAN
BY
Hopkins & Atkins
ATTORNEY.

(No Model.) 8 Sheets—Sheet 8.
V. L. OURDAN.
ENGRAVING MACHINE.
No. 435,246. Patented Aug. 26, 1890.
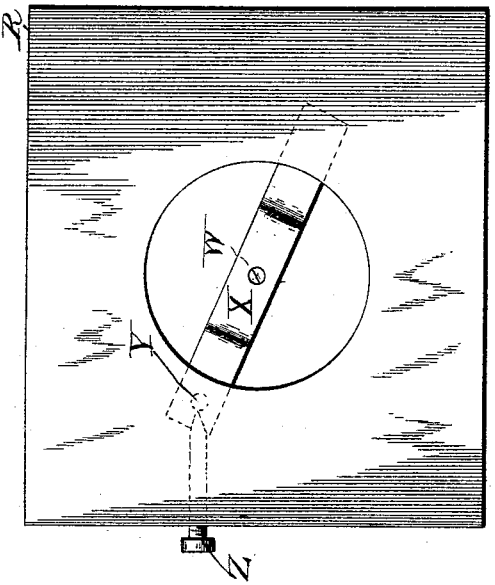
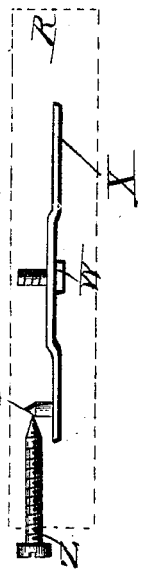
WITNESSES:
INVENTOR.
VINCENT L. OURDAN.
BY
ATTORNEY.

UNITED STATES PATENT OFFICE.

VINCENT L. OURDAN, OF WASHINGTON, DISTRICT OF COLUMBIA, ASSIGNOR TO THE OURDAN & KOLB ENGRAVING MACHINE, ENGRAVING AND MERCANTILE COMPANY, OF VIRGINIA.

ENGRAVING-MACHINE.

SPECIFICATION forming part of Letters Patent No. 435,246, dated August 26, 1890.

Application filed April 3, 1890. Serial No. 346,457. (No model.)

*To all whom it may concern:*

Be it known that I, VINCENT L. OURDAN, of the city of Washington, District of Columbia, have invented certain new and useful Improvements in Engraving-Machines, of which the following is a specification, reference being had to the accompanying drawings.

The object of my invention is to produce a machine that will engrave upon a copper plate, for instance, a row of short parallel lines, each line being inclined at any desirable angle and separated from its neighbors by suitable spacings of uniform size.

My machine is especially adapted for use in shading the borders of map-plates, and also in producing that series of lines which, in the art of chart-engraving, is used to represent mud upon the bottom of a river-channel, for instance. There may be other uses to which it may be put; but these I have specially in view at the present time.

My invention consists in the combination and arrangement of the parts hereinafter set forth.

Figure 1:
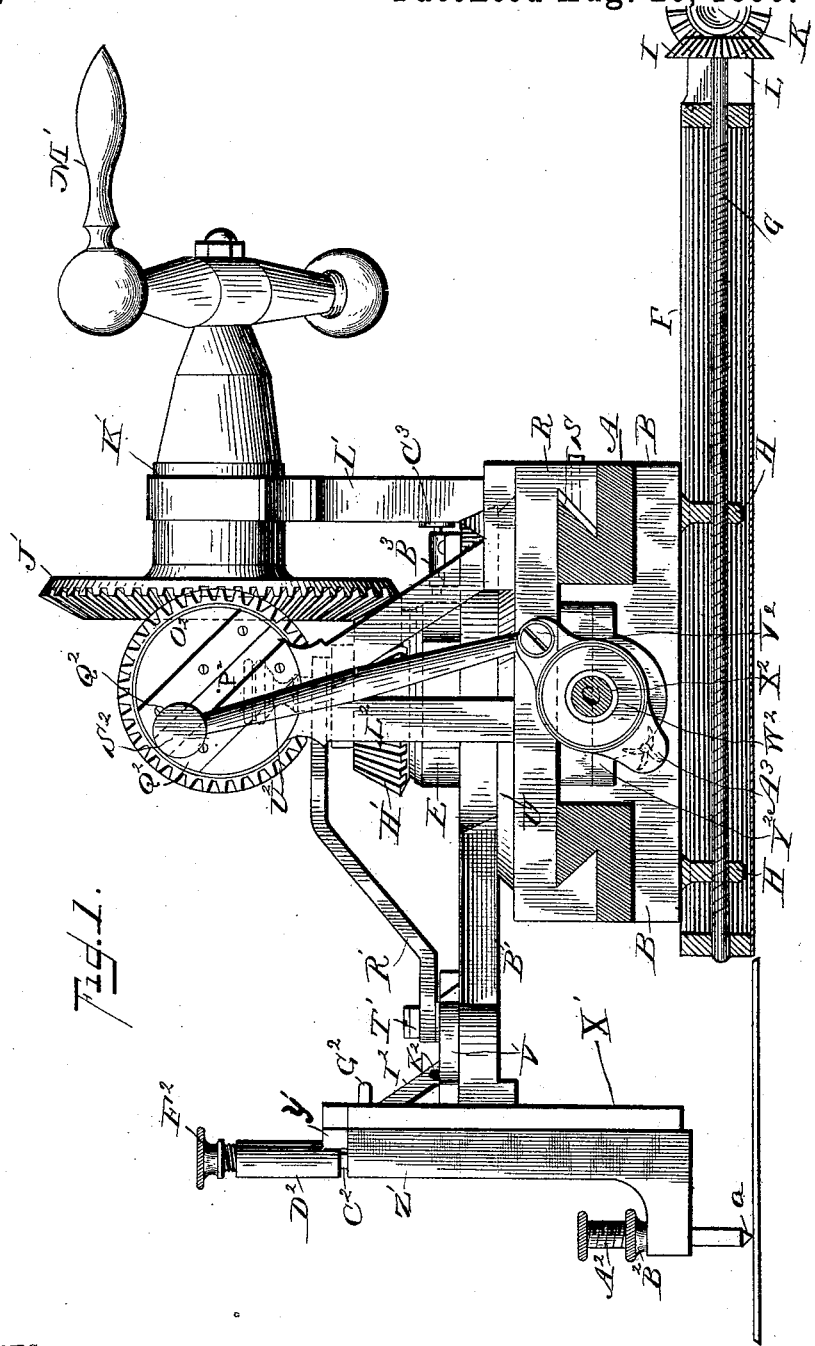
Figure 2:
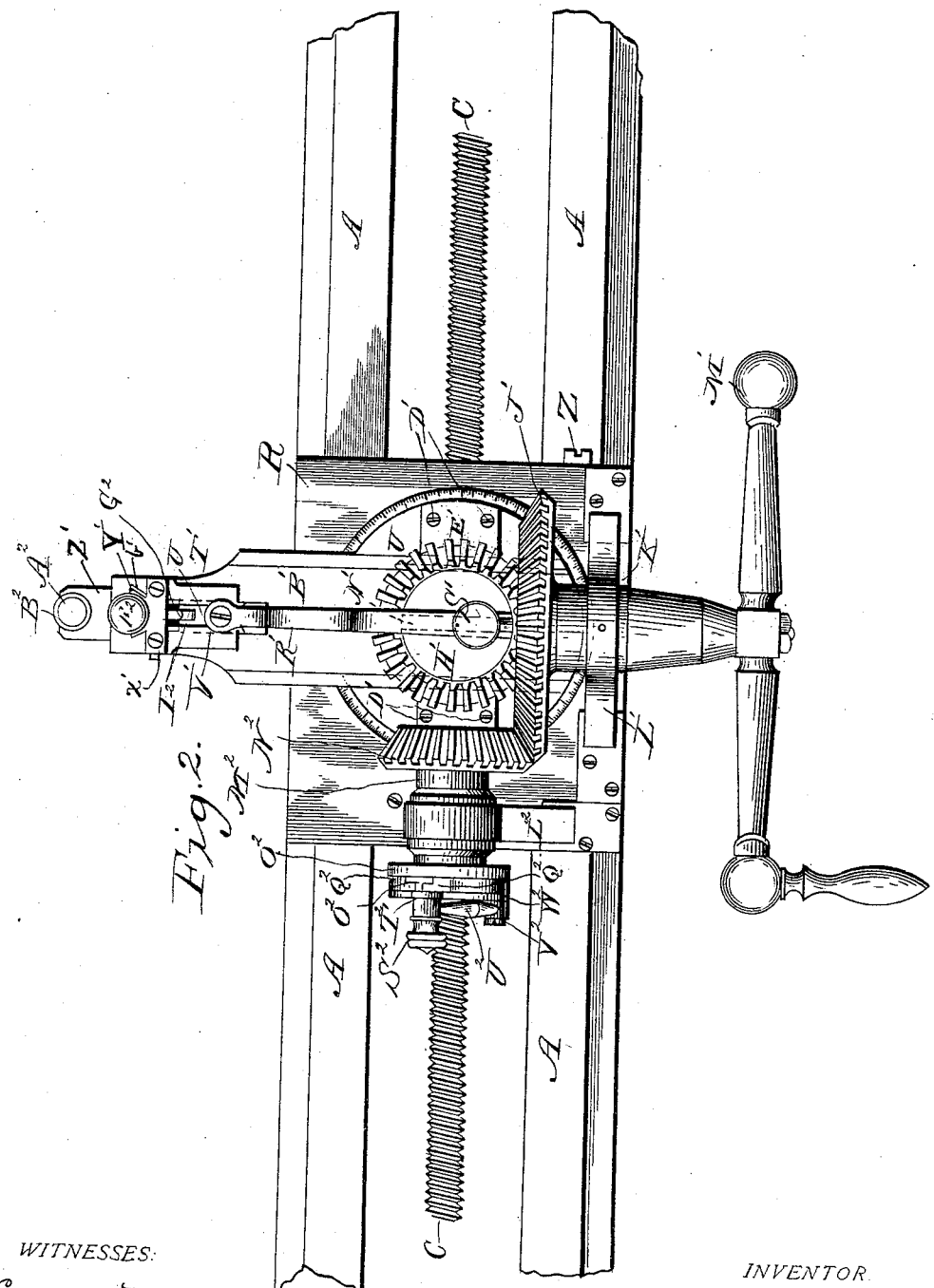
Figure 3:
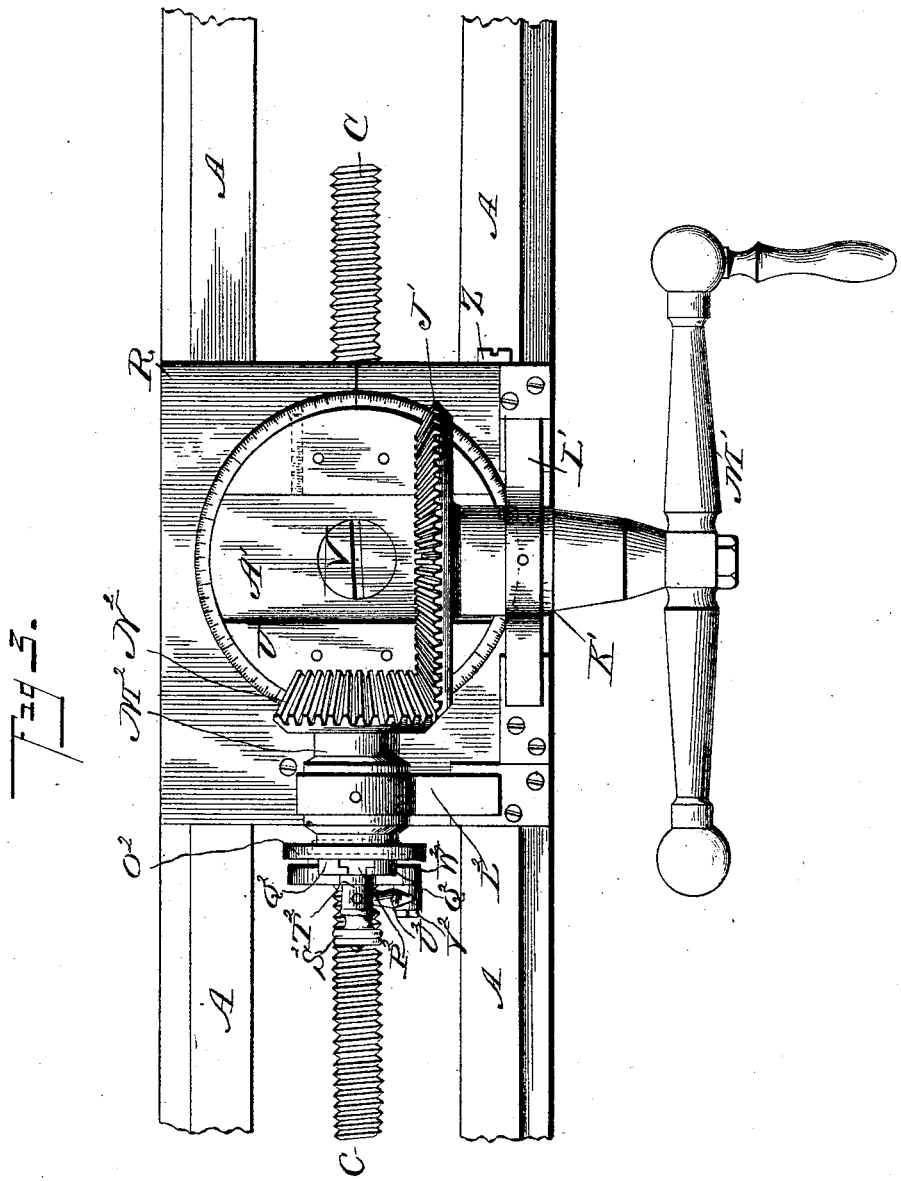
Figure 4:
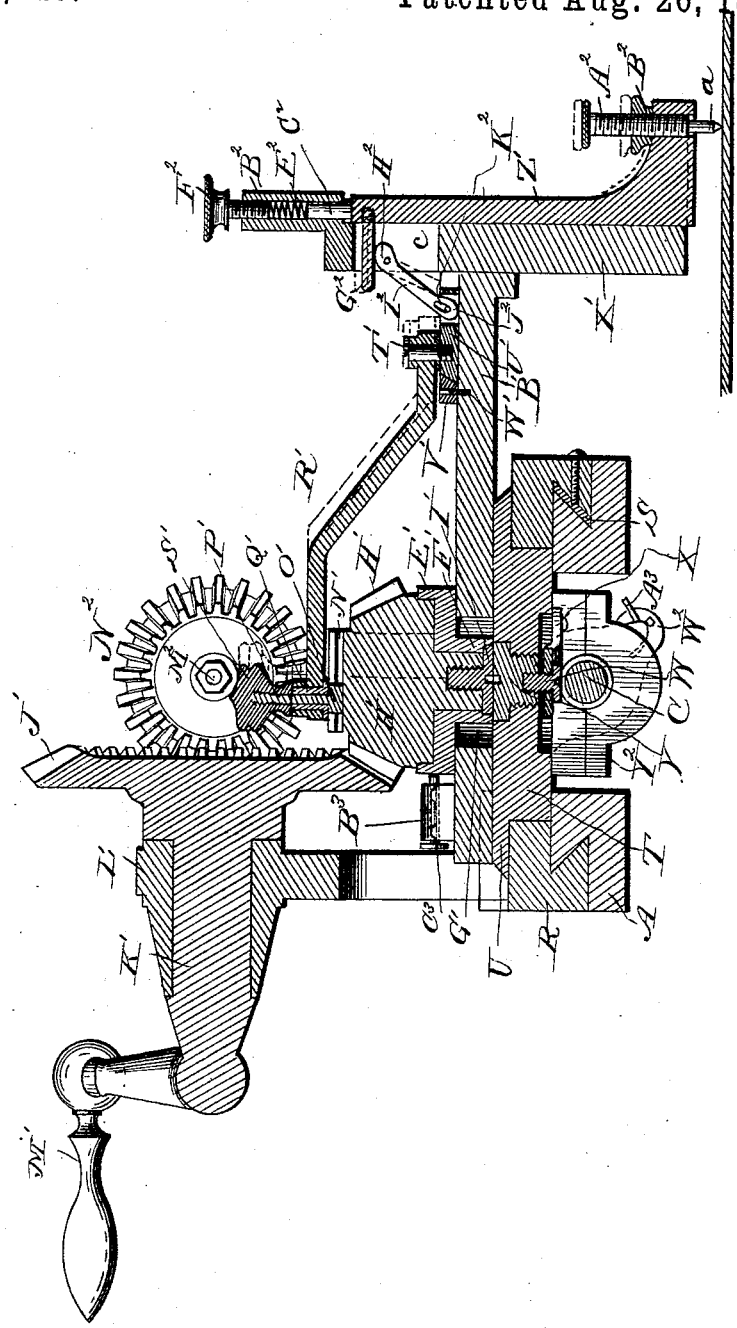

In the accompanying drawings, Figure 1 is an end elevation of my machine, showing the tracks in section. Fig. 2 is a top plan view of the machine with the track cut away at each end. Fig. 3 is a top plan view of the same with part of the mechanism removed. Fig. 4 is a central vertical section of Fig. 1. Fig. 5 is a sectional view corresponding to that shown in Fig. 4 with the driving mechanism removed. Fig. 6 is a top plan view of the tracks upon which the machine moves. Fig. 7 is a longitudinal sectional view of the central portion of my machine. Fig. 8 is a view of one of the end handles detached, showing one end in section to exhibit the binding-screw. Fig. 9 is a detached view of the ratchet mechanism for operating the spacing-screw. Figs. 10 and 11 are detached views of the cranks and pitman for operating the spacing mechanism, showing the parts in different relative positions. Fig. 12 is a detached view of the side of the ratchet mechanism shown in Fig. 9. Fig. 13 is a detached view showing the adjustable crank attachment. Fig. 14 is a horizontal section of Fig. 9. Fig. 15 is a detached view of the bottom of my machine, showing the means for securing certain parts of the mechanism together, and Fig. 16 is a view showing the relative position of the tightening parts.

Referring to the letters on the drawings, A indicates a dovetail track, and B the supporting ends thereof.

C indicates an endless screw, which is coextensive with the track A and is journaled in the opposite ends B. Upon one end of the screw C is provided a crank-handle D, and upon the other a thumb-nut E, the former being designed for rapidly rotating the screw, and the latter being adapted to regulate the frictional resistance of the screw. The ends of the track may be provided with any suitable support—for instance, an ordinary tripod support having one leg at one end and two legs at the other; but I prefer to employ the means of support illustrated in the drawings, whereby the track may be conveniently moved for readjustment transversely over the surface of the plate. It consists of two frame-pieces F, one for each end of the track. In each of these frame-pieces is journaled an endless screw G. Upon the bottom of the ends of the track A are provided internally screw-threaded lugs H, each pair adapted to receive one of the screws G. The ends of the tracks rest upon frame-pieces F, so that a synchronous movement of the screws G will produce an even and equal movement of the track A upon the frame-pieces, which constitute a transverse track. Any convenient means for imparting such motion to the screws G may be employed—for instance, bevel gear-wheels I, secured to the end of each of the screws G, and connected together by the gear-wheels J and shaft K, to which they are secured. The shaft K is journaled in projections L upon each of the frame-pieces, and at one end carries a ratchet-wheel M.

N indicates a pawl-handle collared upon the shaft K and provided with a tilting-pawl O by which the shaft K may be rotated in either direction.

P indicates a projecting arm adjustably secured to one side of the track A and provided with an adjustable collar Q, which carries a point. By means of this device the track may be set at the proper distance from the border line of the plate to be engraved at one end, and the point of the engraving-machine being set at the other end ready to cut, that end may be accurately located to correspond with the end first set in position.

R indicates a square base-piece fitted to the track A and held firmly in position by the gib S, so that it may slide smoothly upon the track. Within a circular aperture in the base is fitted a rotating carrier T, that is provided upon its upper end with a circular head U, having a beveled projection around its lower edge. The beveled edge is divided into degrees for the purpose of setting it with respect to the base which is provided with a set line.

V indicates a screw that is screwed into the top of the carrier, and W a smaller screw that is screwed into the bottom of the screw V.

X indicates a bridge which spans the bottom of the carrier T and is set at its ends upon the base R. At one end it is provided with a conically-pointed stud Y, that penetrates the bottom of the base R. At right angles to the stud is screwed into the base R a set-screw Z, that is provided with a conically-pointed end. The screw W passes through the bridge X and is held to it by its head. By turning the set-screw so that its conical end bears against the conically-pointed end of the stud Y it causes the stud to travel downwardly and to press the bridge secured thereto downwardly, thereby firmly securing the base and the carrier together.

A' indicates a groove or track having dovetail edges that is cut across the middle part of the head of the carrier T, and is adapted to receive the reciprocating bar B', which is provided with a gib C' in one side of the groove A' for securing firmness and evenness of movement. Upon the head of the carrier T is secured by means of screws D' a cross-piece E', that is provided with a central bearing F', which projects downwardly through the longitudinal slot G' in the bar B'. Rotatably carried in the bearing F' is a bevel gear-wheel H', that is secured in place by the screw I'. This screw is screwed into the bottom of the spur gear-wheel and its head extends over into the edges of the bearing F', and when the screw is screwed up is flush therewith. Meshing with the gear-wheel H' is a main bevel gear-wheel J', that is rotatably carried by means of the journal K' upon a vertical bearing L', secured to the base R of the machine. Upon the opposite end of the journal L' is a crank-handle M'. Upon the top of the gear H' in a groove N' is a block O', that carries upon a stud P' and a collar surrounding it an angular arm R'. The end of said arm is pivoted to the collar Q', and it is held in position, and the block O is adapted to be firmly secured in any position in the groove N', by means of the thumb-screw S', that is screwed upon the end of the stud P'. Upon the other end of the arm R', by means of the screw T', is secured a sliding block U', that moves in a longitudinal slot formed in the frame V', which is secured by means of the screw W' to the outer end of the bar B'. To the end of this bar B' is secured a vertical head X', to the front of which, upon a dovetailed track Y', is movably fastened the foot Z', that carries the vertically-adjustable screw-threaded engraving-tool carrier A² and separate point $a$ carried therein. B² indicates a thumb-nut for locking the tool-carrier in position, and $b$ a gib between the track Y' and the foot Z'. Upon the upper end of the foot Z' is provided a pin C², that enters the tubular cover D² upon the top of the head X'. Within this cover is located a spring E², whose pressure upon the pin C² is regulated by the thumb-screw F², that is screwed into the top of the cover.

G² indicates an inwardly-projecting stud extending through the slot $c$ in the head X' at right angles from the top of the foot Z', to which it is fastened. Pivoted by the pin H² to the head X' is the link I², that is loosely secured at its opposite end by means of the pin J² and slot K² to the block U'. The upper end of the link I² is provided with a cam-surface, which presses against the stud G².

L² indicates a standard that is secured to the base R and rotatably carries by means of the shaft M² the bevel gear-wheel N², which meshes with the main gear J'. Upon the end of the shaft M², opposite the gear N², is secured a circular head O², that is provided across its face with a groove P², which is formed by the ribs Q², screwed to the face of the head.

R² indicates a block similar in construction to the block O', that is illustrated in detail. The block R², like the block O', carries upon a screw-headed stud the thumb-screw S² and the collar T², by means whereof it may be secured in place in the groove P² and may pivotally carry the pitman U². To the other end of this pitman, by means of a crank-pin V², is secured an oscillating collar W², which is revolubly fastened upon the sleeve X². This sleeve is rotatably carried in a split collar Y², that is fastened to the base R and extends downwardly from it. The interior of the sleeve X² is internally screw-threaded to fit the threads of the screw C. Upon one end of the sleeve is provided a ratchet-wheel Z², that engages with a tilting pawl A³, which is pivoted to the oscillating collar W², by means whereof rotary motion from the pitman U² may be imparted to the sleeve X² in either direction and the sleeve and the parts connected therewith be made to travel along the screw C.

Upon the tail of the reciprocating bar B' is secured an internally screw-threaded bearing B³, which carries an abutment-screw C³. The end of the screw is adapted to strike against the side of the cross-piece E', so as to limit the movement in one direction of the bar B'.

All the foregoing parts described as attached to the base I will designate as the "tool-carriage."

$D^3$ (see Fig. 8) indicates a handle that is adapted to be applied to the ends of the track A, as shown in Fig. 6, for lifting it. It is provided with a gib $E^3$ and gib-screw $F^3$, and is adapted to fit over the edges of the track and to be firmly secured to it by means of the gib.

The operation of my machine is as follows: Suppose it is to be used for engraving border shading. The track A is set by means of the engraving-point on the machine and the point in the adjustable collar Q on the sliding arm P, so that the sides of the track are parallel with the border-line of the plate. Then, having previously set the block O' in the desired position in the groove N' and the block $R^2$ in the proper position in the groove $P^2$, proceed to turn the crank-handle M' in either direction. The main gear-wheel J', which is connected by the shaft L' with the crank, will communicate motion simultaneously to the gear-wheels H' and $M^2$ and cause them to revolve synchronously. As the gear-wheel H' revolves, it imparts a reciprocating motion to the angular arm R', which in turn communicates that motion to the slide-block U'. The operation which follows will be understood by comparing the relative positions of the parts illustrated in Figs. 4 and 5. Suppose when motion is first imparted to the block U' it is in the position shown in Fig. 4. As it moves forward, it will raise the top of the cam of the link $I^2$ against the stud $G^2$ and lift the foot Z' to the position shown in full lines in Fig. 5, in which position the block U' will strike against the head X', and the further movement in the same direction of the angular arm R' will be communicated through the head to the bar B', and it will be pushed out through its track in the head of the carrier T until the limit of motion in that direction of the bar R' is reached. Then as the crank-handle continues to turn the lower end of the link $H^2$ will be drawn backward by the return of the arm R' until the point of the engraving-tool is let down and set into the metal. At this stage the block U' will have returned again to the position which it occupies in Fig. 4 against the rear of the frame V', and the further movement in the backward direction of the arm R' will be communicated to the bar B' and will draw the point of the engraving-tool across the face of the metal to be engraved until the limit of movement of the arm in the backward direction is reached. Thereupon the operation, as described, will be repeated again and again as long as the crank-handle M' is turned. It should be understood that the movement of the engraving-tool will be very rapid and that the border shading by this means may be performed not only with great speed but with perfect accuracy.

If the operation just described were continued without providing other mechanism it is obvious that the engraving-tool would cut in the same line, but that if the tool-operating mechanism were after each cut moved a certain determinate space a series of short parallel lines of the same length would be engraved upon the metal. I therefore provide a circular head $O^2$ upon the end of the shaft that carries the gear $N^2$, and that meshes with the main gear J'. When the block $R^2$ has been secured in the proper position in the groove $P^2$ with reference to the position of the block O' upon the gear H', the operation of the crank-handle M' will communicate through the parts just described and the pitman $U^2$ and ratchet mechanism connected therewith a partial revolution to the sleeve $X^2$; but, as above suggested, every turn of the sleeve $X^2$ upon the screw C will move the base R and the parts secured thereto, including the engraving-tool, a certain distance along the track A. Let it be observed that this rotation of the sleeve $X^2$ upon the screw C is made and the parts are in position to impart another turn to the sleeve each time the gear-wheel H' makes a complete revolution. The blocks $R^2$ and O' may be so adjusted with respect to the groove N' and $P^2$, respectively, that the engraving-tool will be lifted and carried into position for a cut while the spacing mechanism is operating, and while the engraving-tool is cutting the pawl of the spacing mechanism will slip loosely around the ratchet $Z^2$, so that by the time the cut has been finished the spacing mechanism will be in position to again perform its function. It is possible by the adjustment of the parts just described to cause the spacing mechanism and the cutting mechanism to operate simultaneously, by which means the engraving-tool will be caused to describe a curve instead of a straight line. This it would always do if after reaching the end of a line to be engraved the pawl of the spacing mechanism were set so as to draw the engraving mechanism backward upon the track without changing the relations of the spacing and cutting mechanisms; but if after this has been done the position of the block $R^2$ in the groove $P^2$ be reversed from what it was in making the forward movement the spacing and cutting operations will be properly timed to produce also the straight cut in the backward movement. The same result may be attained by changing the adjustment of the block O' in groove N'.

It will be readily understood from the description and the drawings that the length of cut of the engraving-tool is determined by the position of the block O' with respect to the groove N', and that the spaces between the lines may be regulated by the block $R^2$ with respect to the groove $P^2$.

In the operation of the machine, as above described, the reciprocating bar B' has been supposed to reciprocate in the position shown in the drawings, and the engraved lines are at right angles to the track A. If it is desired to change the angle of the engraved lines with respect to the track it may be done by loosening the screw Z and shifting by means of the bar B' the rotary carrier T to the desired place. The angle may be determined by the graduation upon the beveled edge in the head of the rotary carrier. After the carrier has been set in proper position the screw Z should be screwed back into place, when the parts will be firmly fastened together. The rotation of the crank-handle M', as before described, will cause the engraving-tool to move upon the angle desired.

In order to prevent binding between the block U' and the link I² when the bar B' is shoved forward by the angular arm R', I provide the abutment-screw C³ and adjust it so that it strikes against the side of the bearing F' when the bar B' has moved the proper distance to permit the continued revolution of the gear H'; but for this device the bar B' might be pushed too far forward and stick on account of the binding between the parts above referred to, but with it that difficulty is avoided.

The transverse tracks are adapted to be used in engraving mud, in which it is necessary to evenly and rapidly shift the position of the machine across the plate to be engraved. It will be understood of course that the crank-handle D upon the screw C is adapted to rapidly move the carriage along the tracks when the distance of space between the parts engraved is very great.

What I claim is—

1. The combination, with a track and an endless screw parallel therewith, of a tool-carriage mounted upon the track and provided with an engraving-tool adapted to be reciprocated, intermittently-acting spacing mechanism upon the carriage adapted to engage with the screw and move the carriage upon its track, and a system of gearing connecting the spacing mechanism and the engraving-tool and provided with a main gear-wheel whereby the rotation of said gear-wheel will simultaneously operate the spacing and engraving mechanism, substantially as set forth.

2. The combination, with the track A, of a tool-carriage provided with intermittently-acting spacing mechanism and engraving mechanism, transverse tracks provided with endless screws connected with the track A, and a shaft and gearing operatively connected with said endless screws whereby the rotation of said shaft will move the track A and mechanism carried thereon parallel to the direction of the transverse tracks, substantially as set forth.

3. The combination, with the tool-carriage, the track upon which it is adapted to move, and an endless screw parallel with said track, of spacing mechanism and engraving mechanism carried upon said carriage, gear-wheels upon said carriage, connecting-pieces between such gear-wheel and the spacing mechanism and the engraving mechanism, respectively, means for adjustably uniting said connections to said gear-wheels, and a main gear-wheel meshing with both the other wheels, substantially as set forth.

4. The combination, with a track and an endless screw combined therewith, of a tool-carriage, spacing mechanism operatively connected with the endless screw, and reciprocating mechanism adapted to carry an engraving-tool, the gears N² and H' arranged at right angles to each other, and connections between said gears and the spacing mechanism and engraving mechanism, respectively, whereby the simultaneous rotation of said gears will produce motion of the tool-carriage along the track and reciprocation of the engraving mechanism, substantially as set forth.

5. The combination, with the carrier, of a bar B', adapted to be reciprocated and carrying an engraving-tool, a gear-wheel rotatably secured to the carrier, an arm secured at one end to the bar B', and means for adjustably securing it at the other end to the face of the gear-wheel whereby the bar B' may be reciprocated determinate distances by the rotation of the wheel, substantially as set forth.

6. The combination, with a carrier and a reciprocating bar B', movably secured thereto, of a movable foot secured to one end of the bar, the arm R', movably secured to the end of the bar B' and adapted to be reciprocated between fixed limits on said bar, and a connection between the movable foot and the arm R' whereby the reciprocation of the arm may alternately lift the foot and cause the reciprocation of the bar B', substantially as set forth.

7. In an engraving-machine, the combination, with the carrier, of the reciprocating bar B', movably secured thereto, the arm R', adapted to be reciprocated thereon and secured to a sliding block adapted to move within fixed limits on the bar B', the movable foot Z, secured to the head of the bar B', and the link I², loosely secured at one end to the sliding block and pivoted at the other end to the head X', the latter end being provided with a cam-surface adapted to raise the foot so that it will be alternately raised and lowered before each reciprocation while the block is traveling between its fixed limits to produce a reciprocation of the bar B', substantially as set forth.

8. In an engraving-machine, the combination, with the track A and an endless screw combined therewith, of the tool-carriage provided with spacing mechanism adapted to move the same upon the track, engraving mechanism for engraving a row of short parallel lines, means for setting the engraving mechanism at any desired angle upon the carriage, and gearing for operating the spacing and engraving mechanism simultaneously, substantially as set forth.

9. In an engraving-machine, the combination, with the base R and the carrier W, adjustably secured thereto, of a reciprocating bar B', movably secured upon top of the carrier, and mechanism for uniting the base to the carrier, substantially as set forth.

10. The combination, with the base R, of the carrier W, adapted to be secured thereto, the bridge X and the stud Y, and screw Z, located in contact with and at right angles to each other for the purpose of securing the base to the carrier, substantially as set forth.

11. In an engraving-machine provided with spacing mechanism and engraving mechanism, substantially as described, the combination, with the gears $N^2$ and H', adapted, respectively, to transmit motion to the spacing and engraving mechanism and provided with diametrical grooves across their faces, of connecting-pieces between the spacing mechanism and the engraving mechanism and the gears $N^2$ and H', respectively, and means for adjustably uniting each of said connecting-pieces to the groove in its proper gear, as and for the purpose specified.

12. In an engraving-machine, the combination, with a track or carrier, of the reciprocating bar B', a sliding block borne between fixed limits on said bar, mechanism carried with the bar and adapted to produce a reciprocation of the block, the yieldingly-depressed foot Z', carried on the head X' of the bar B', the link $I^2$, loosely pivoted to the sliding block at one end and pivoted to the head X' at the other, the latter end being provided with a cam-surface, and a projection from the foot Z', with which said cam is adapted to engage to alternately raise and lower said foot between each full reciprocation of the sliding block, substantially as set forth.

13. In an engraving-machine, the combination, with a movable part, of an externally screw-threaded carrier $A^2$, adapted to be set into an internally screw-threaded bearing on the movable part and to carry a detachable engraving-point, substantially as set forth.

In testimony of all which I have hereunto subscribed my name.

VINCENT L. OURDAN.

Witnesses:
JOSEPH L. ATKINS,
THOS. S. HOPKINS.